(12) United States Patent
Hulsey

(10) Patent No.: US 6,250,034 B1
(45) Date of Patent: Jun. 26, 2001

(54) MEMBRANE PLATE

(75) Inventor: Tommy Ray Hulsey, Sulphur Springs, TX (US)

(73) Assignee: Construction Fasteners, Inc., Wyomissing, PA (US)

( * ) Notice: Subject to any disclaimer, the term of this patent is extended or adjusted under 35 U.S.C. 154(b) by 0 days.

(21) Appl. No.: 09/437,915

(22) Filed: Nov. 9, 1999

(51) Int. Cl.$^7$ .................................................. E04B 5/00
(52) U.S. Cl. .................................. 52/410; 52/63; 411/545
(58) Field of Search ....................... 52/410, 408; 411/531, 411/545, 461–466

(56) References Cited

U.S. PATENT DOCUMENTS

| | | | |
|---|---|---|---|
| 1,714,174 | * | 5/1929 | Lichtenberg et al. . |
| 4,502,256 | * | 3/1985 | Hahn ........................................ 52/63 |
| 4,686,808 | * | 8/1987 | Triplett .................................... 52/410 |
| 4,763,456 | * | 8/1988 | Giannuzi ................................. 52/410 |
| 5,094,056 | * | 3/1992 | Peters ..................................... 52/410 |
| 5,951,225 | * | 9/1999 | Osterle et al. ......................... 411/545 |

* cited by examiner

Primary Examiner—Carl D. Friedman
Assistant Examiner—Steve Varner

(74) Attorney, Agent, or Firm—Caesar, Rivise, Bernstein, Cohen & Pokotilow, Ltd.

(57) ABSTRACT

An improved membrane plate for attaching a membrane to a roof is disclosed. The improved membrane plate includes a plate body portion having a bottom surface for disposing the bottom surface against the membrane and an opening to permit a fastening device to pass therethrough for securing the membrane plate and the membrane to the roof. A plurality of spaced apart lances joined to said plate body portion by a hinged lance edge and extending downwardly from the plate body portion wherein the spaced apart lances are disposed upon the plate body portion to define an oval shape having a longitudinal oval axis. The hinged edges are aligned parallel to the longitudinal oval axis. The membrane plate is subjected to a shear force when attached to the roof and is disposed such that the longitudinal oval axis of the membrane plate is perpendicular to the shear force. The lances include longitudinal lance edges extending from the plate body to a lance tip and the longitudinal lance edges of all of the lances are aligned perpendicular to the shear force. The plate body portion can be an oval-shaped region. An annular ridge is formed to define a plurality of recesses and a lance of the plurality of lances is disposed within each of the recesses. A central hub region defined by an annular ridge is provided wherein the opening passes through the central hub region.

13 Claims, 2 Drawing Sheets

MEMBRANE PLATE

FIELD OF THE INVENTION

The invention pertains to membrane plates and more particularly to a membrane plate for attaching a membrane to a roof.

BACKGROUND OF INVENTION

Stress plates have been used previously, for example, to attach membranes to substrates such as a roof. Such stress plates are normally provided with a plurality of spaced apart prongs that are hingedly coupled to the stress plate and extend downwardly from the bottom of the stress plate. The prongs can have a length such that they merely grip the membrane or a length sufficient to extend through the membrane and into the roof.

The membrane is placed over the substrate in order to, for example, provide sealing and water proofing of the roof. The stress plate is placed over the membrane. A fastening device, such as a screw is inserted through an opening in the center of the stress plate. The fastener device extends through the membrane and into the roof. The fastener device is thus attached to the roof causing the membrane to be secured to the roof by the stress plate and the fastener device.

When using a stress plate, sometimes known as a membrane plate or a clamping plate, for securing a membrane to a roof, insulating material may be disposed between the membrane and the roof. The insulating material can be in the form of an insulation board or other insulation material.

It is well known for a stress plate to be formed with a circular shape. For example, U.S. Pat. No. 4,787,188 (Murphy) teaches a circular stress plate. The stress plate taught by Murphy has an outer circular rib and an inner circular rib as well as a plurality of hinged prongs. The hinged prongs are disposed at equal radial distances from the center of the stress plate and circumferentially spaced apart from each other at angles of 90°. Each of the hinges of the prongs taught by Murphy is aligned at an angle of 90° with respect to a radius of the circular stress plate.

U. S. Pat. No. 4,282,050 (Thiis-Evensen) teaches a stress plate for cladding a roof on a support structure. The fastening process taught includes applying an insulation layer on the support structure and applying edge abutting webs of cladding material over the insulation layer. The insulation layer and the cladding layers are simultaneously mechanically anchored to the support structure using fasteners. The edges of the webs and the fasteners are sealed by welding strips. The fastener taught by Thiis-Evensen for fastening the layers to the support structure is rectangular in shape with gripping claws disposed at each end of the plate.

U.S. Pat. No. 4,543,763 (Ernst) teaches a fastening plate having circumferentially spaced apart projections disposed on the plate. The plates taught by Ernst can be round or square and are adapted to control the rate of axial penetration of an anchor in a masonry structure.

When a stress plate is attached to a membrane and a substrate to form a stress plate assembly in this manner different forces are applied to the assembly during normal use. One significant force applied to the stress plate assembly is shear force. A shear force is a force that is applied to the stress plate assembly parallel to the surface of the membrane. Shear forces can result from uplift pressure due to wind hitting the roof. In the region where the stress plate attaches the membrane to the substrate the shear forces can result in rubbing of the membrane against the stress plate and, in particular, rubbing of the membrane against the prongs of the stress plate. This rubbing can promote tearing of the membrane.

SUMMARY OF THE INVENTION

An improved membrane plate for attaching a membrane to a roof is disclosed. The improved membrane plate includes a plate body portion having a bottom surface for disposing the bottom surface against the membrane and an opening to permit a fastening device to pass therethrough for securing the membrane plate and the membrane to the roof. A plurality of spaced apart lances joined to said plate body portion by a hinged lance edge and extending downwardly from the plate body portion wherein the spaced apart lances are disposed upon the plate body portion to define an oval shape having a longitudinal oval axis. The hinged lance edges are aligned parallel to the longitudinal oval axis. The membrane plate is subjected to a shear force when attached to the roof and is disposed such that said longitudinal oval axis of the membrane plate is perpendicular to the shear force. The lances include longitudinal lance edges extending from the plate body to a lance tip and the longitudinal lance edges of all of the lances are aligned perpendicular to the shear force.

DETAILED DESCRIPTION OF THE PREFERRED EMBODIMENT

Figure 1:
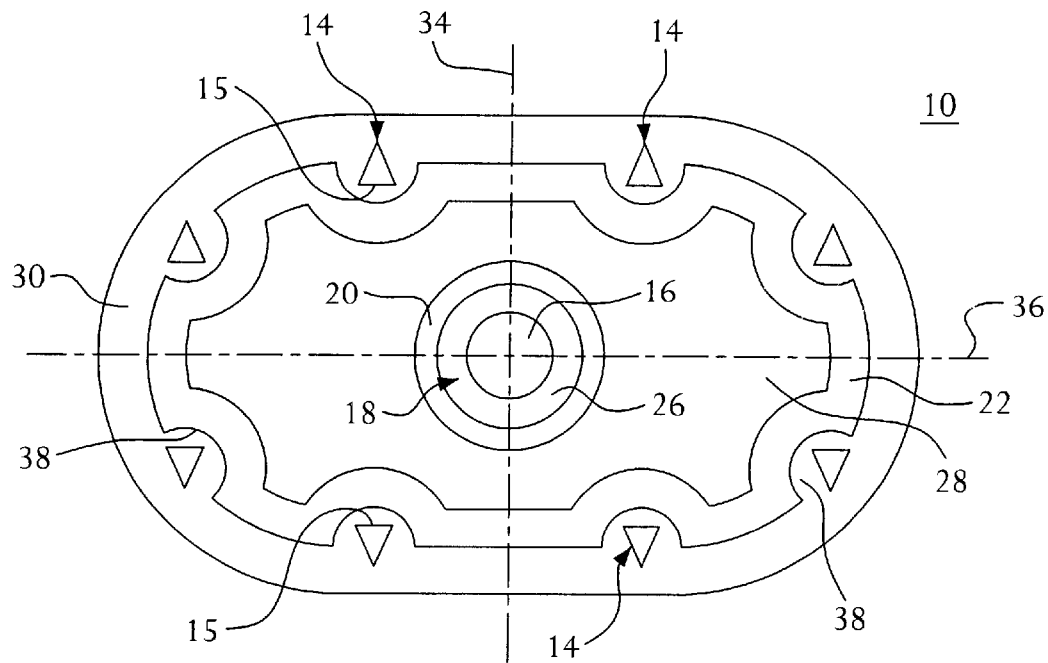
FIG. 1 shows a top plan view of the oval membrane plate of the present invention.
Figure 2:
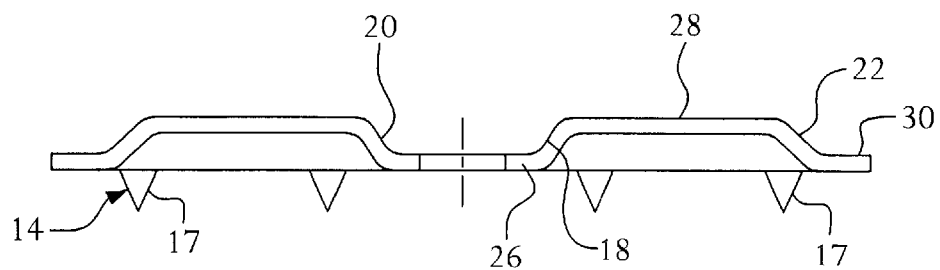
FIG. 2 shows a longitudinal cross-sectional view of the oval membrane plate of the present invention.

Referring now to FIGS. 1 and 2, there are shown a top view and a cross-sectional view of the oval membrane plate 10 of the present invention. The oval membrane plate 10 is formed with a hub region 18 and has a longitudinal oval axis 36 and a transverse oval axis 34. The hub region 18 is formed with a hub floor 26 and a fastener opening 16 passing through the hub floor 26. The fastener opening 16 is adapted to permit a fastening device such as a screw to pass through the oval membrane plate 10 and fasten the oval membrane 10 and a membrane to a substrate such as a roof.

The hub region 18 is substantially centrally located with respect to the body of the membrane plate 10 and is generally defined by an annular ridge 20. The annular ridge 20 extends upwardly and radially from the hub floor 26. In one embodiment of the invention the annular ridge 20 can extend upwardly at an angle of approximately thirty degrees with respect to a vertical axis.

The annular ridge 20 extends upwardly to a horizontal central plate portion 28 of the oval membrane plate 10. At the outer edge of the central plate portion 28 an annular ridge 22 extends radially and downwardly to a circumferential lip portion 30. The annular ridge 22 is formed so as to define a plurality of recesses 38 opening onto the circumferential lip portion 30.

In the preferred embodiment of the oval membrane plate 10 eight recesses 38 are provided in a circumferentially spaced apart relationship upon membrane plate 10. The recesses 38 are located to generally define an oval shape substantially concentric with the oval shape of the body portion of the membrane plate 10. Within each recess 38 a prong 14 or a lance 14 is formed wherein the lances 14 are also disposed so as to define an oval shape. The lances 14 can be formed, for example, by stamping the body portion of oval membrane plate 10 and thereby perforating the oval membrane plate 10.

The lances 14 are generally triangular in shape having a transverse hinged edge 15 joining the lance 14 to the body portion of the membrane plate 10. The lances 14 also have two longitudinal edges 17 extending downwardly from the body portion of the plate and terminating in a sharp tip. The longitudinal dimension of the lances 14 can be sufficient to merely pierce the surface of a membrane disposed below the membrane plate 10, or sufficient to extend entirely through an underlying membrane to grip a roof therebelow. The lances 14 are formed such that their hinged edges 15 are aligned parallel to the longitudinal axis 36 of the oval membrane plate 10.

Figure 3:
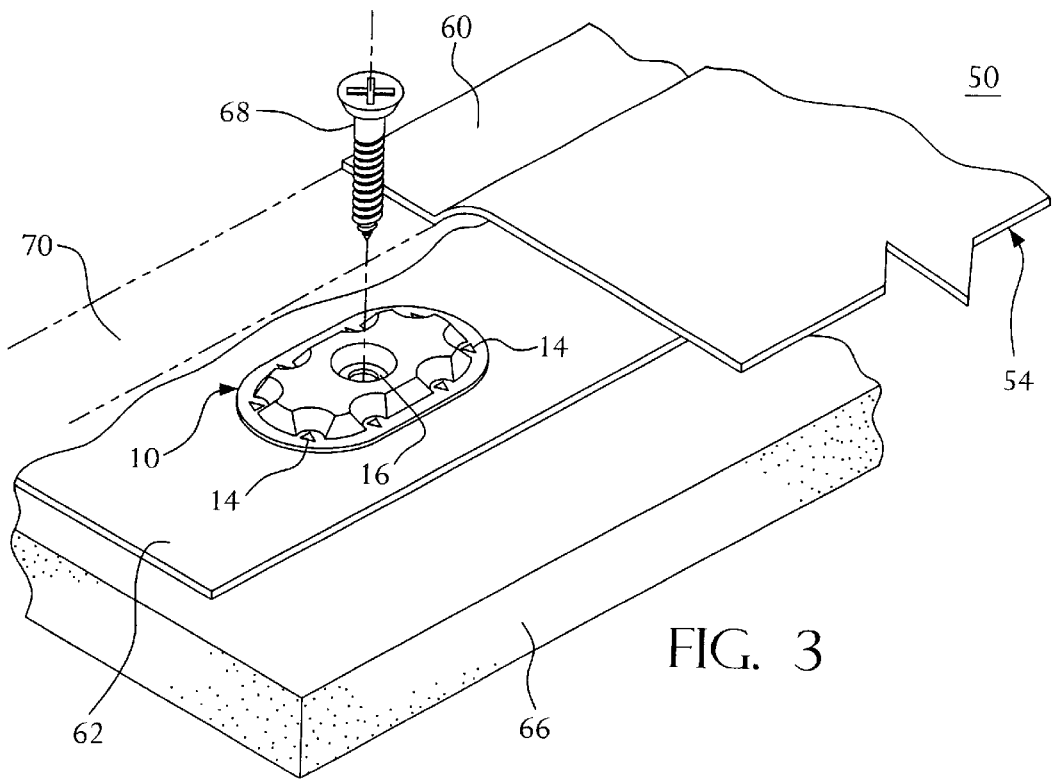
FIG. 3 shows the use of the oval membrane plate of the present invention to fasten membranes to an insulation board.

Referring now to FIG. 3, there is shown a membrane fastening system 50 for attaching membranes 54, 62 to a substrate. Membranes 54, 62 can be formed of any suitable material, for example, polyvinyl chloride or synthetic rubber. The oval membrane plate 10 of the present invention can be used within the membrane fastening system 50 to attach the membranes 54, 62 to an insulation board 66. In order to attach membranes 54, 62 in this manner, the membrane 62 is disposed upon the surface of the insulation board 66 and the bottom surface of membrane plate 10 is disposed upon the membrane 62.

A fastening device 68 is inserted through the opening 16 of the membrane plate 10 and forcibly inserted through the membrane 62 and into the insulation board 66 below the membrane 62. As the fastening device 68 is advanced the lances 14 are driven into the membrane 62. The membrane 54 is then disposed over the insulation board 66. The membrane 54 is welded to the membrane 62 at the weld seam region 60 of the membrane 54 and the weld seam region 70 of the membrane 62 in a convention manner. Thus, the membrane plate 10 and the membranes 54, 62 are attached to the insulation board 66.

Figure 4:
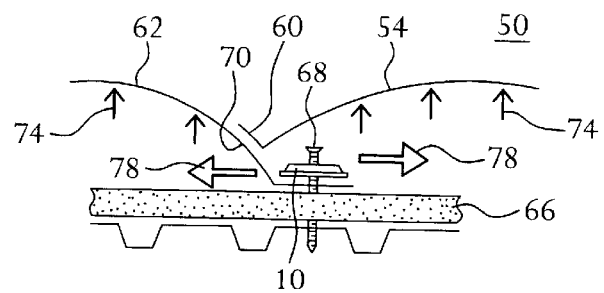
FIG. 4 shows a side cross-sectional view of a source of shear forces applied at the point of attachment of a membrane and a fastener such as the fastener of the present invention.

Referring now to FIG. 4, there is shown a schematic representation of one way in which shear forces can be created and applied to the membrane fastening system 50. During normal usage of the membrane fastening system 50 uplift pressure is applied to the membranes 54, 62. For example, the uplift pressure can be applied because of wind hitting the roof to which the membranes 54, 62 are attached. The uplift pressure is indicated in FIG. 4 by arrows 74.

In a manner well known to those skilled in the art, the uplift pressure of arrows 74 results in shear forces in the region where the stress plate 10 and the membrane 54 are attached as indicated by the arrows 78. The shear forces created in this manner cause the membrane 62 to push and pull against the membrane plate 10 and, in particular, against the lances 14 of membrane plate 10. The pushing and pulling is in the plane of membrane 62 and stress plate 10.

Figure 5A:
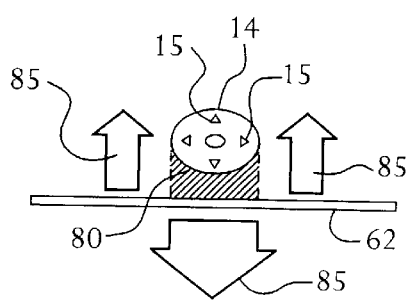
FIGS. 5A, B show schematic representations of shear forces applied to membrane plates having two different shapes.
Figure 5B:
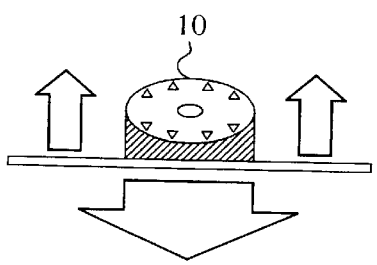

Referring now to FIGS. 5A, B, there are shown schematic representations of shear forces, such as the shear forces illustrated in FIG. 4, applied to two membrane plates 10, 80 of differing shapes. The shear forces of FIGS. 5A, B are indicated by the arrows 85. The membrane plate 80 has four lances 14 each having a hinged edge 15. Two of the hinged edges 15 of the membrane plate 80 are aligned perpendicular to the direction of the shear forces as indicated by the arrows 85. The two remaining hinged edges 15 of the membrane plate 80 are aligned parallel to the shear forces.

It will be understood that when the hinged edges 15 are not aligned perpendicular to the shear forces the longitudinal edges 17 act as cutting edges because the membrane 62 tends to rub against the edges 17 of the lances 14 in this orientation. The rubbing promotes cutting of the membrane 62 over a period of time. Furthermore, it will be understood that it is not possible to rotatably align the membrane plate 80 such that none of the longitudinal edges 17 are aligned to cut the membrane 62 because there will always be some hinged edges 15 that are not perpendicular to the shear forces.

In the membrane plate 10 of the present invention all of the hinged edges 15 of the lances 14 are aligned perpendicular to the shear forces of arrows 85 when the longitudinal oval axis 36 is disposed perpendicular to the direction of the shear forces. In this manner, no longitudinal edges 17 of the membrane plate 10 are aligned in a position which promotes cutting and tearing of membrane 62 when the membrane 62 is forced against the stress plate 10 by the shear force.

Without further elaboration, the foregoing will so fully illustrate the invention that others may, by applying current or future knowledge, adapt the same for use under various conditions of service.

I claim:

1. An improved membrane plate for attaching a membrane to a roof, comprising:
    a plate body portion having a bottom surface for disposing said bottom surface against said membrane and an opening to permit a fastening device to pass therethrough for securing said membrane plate and said membrane to said roof;
    a plurality of spaced apart lances joined to said plate body portion by respective hinged lance edges, said lances extending downwardly from said plate body portion;
    said lances being disposed in a substantially oval shaped arrangement, said substantially oval shaped arrangement having a longitudinal oval axis; and
    said hinged lance edges being aligned parallel to said longitudinal oval axis.

2. The improved membrane plate of claim 1, wherein said membrane plate is subjected to a shear force when attached to said roof and is disposed such that said longitudinal oval axis is perpendicular to said shear force.

3. The improved membrane plate of claim 2, wherein said lances include longitudinal lance edges extending from said plate body portion to a lance tip and all of said longitudinal lance edges of all of said lances are aligned perpendicular to said shear force.

4. The improved membrane plate of claim 1, wherein said plate body portion comprises a plurality of recesses.

5. The improved membrane plate of claim 4, wherein the recesses of said plurality of recesses are disposed to define an oval shape.

6. The improved membrane plate of claim 5, wherein a lance of said plurality lances is disposed within each of said recesses.

7. The improved membrane plate of claim 6, comprising an annular ridge formed to define said plurality of recesses.

8. The improved membrane plate of claim 1, comprising a central hub region wherein said opening passes through said central hub region.

9. The improved membrane plate of claim 8, wherein said central hub region is defined by an annular ridge.

10. The improved membrane plate of claim 1, wherein said fastening device is a screw.

11. The improved membrane plate of claim 1, wherein said plate body portion comprises an oval-shaped portion.

12. The improved membrane plate of claim 1, wherein said lances comprise stamped triangular lances.

13. The improved membrane plate of claim 1, comprising eight spaced apart lances.

* * * * *